United States Patent [19]
Kobayashi et al.

[11] Patent Number: 4,872,445
[45] Date of Patent: Oct. 10, 1989

[54] COOKING UTENSIL

[75] Inventors: Hiroshi Kobayashi; Masae Kobayashi, both of Kodaira; Haruhiko Machida, Tokyo, all of Japan

[73] Assignee: Techno-Frontier Ltd., Kodaira, Japan

[21] Appl. No.: 212,781

[22] Filed: Jun. 29, 1988

[30] Foreign Application Priority Data

Jun. 29, 1987 [JP] Japan .............................. 62-99964[U]
Dec. 17, 1987 [JP] Japan ........................... 62-191617[U]

[51] Int. Cl.$^4$ .............................................. A47J 27/10
[52] U.S. Cl. ...................................... 126/376; 99/447; 220/94 A
[58] Field of Search ............... 126/376, 390, 373, 387, 126/389; 99/447; 220/400, 469, 94 A, 94 B, 367

[56] References Cited

U.S. PATENT DOCUMENTS

| | | | |
|---|---|---|---|
| 1,609,114 | 11/1926 | Gray | 126/376 |
| 1,710,971 | 4/1929 | Dick | 126/376 |
| 2,517,320 | 8/1950 | Johnston | 126/376 |
| 3,982,479 | 9/1976 | Sova | 126/376 X |

FOREIGN PATENT DOCUMENTS 6809 of 1902 United Kingdom ................ 126/376

*Primary Examiner*—Randall L. Green
*Attorney, Agent, or Firm*—Hoffmann & Baron

[57] ABSTRACT

The present invention concerns an improved cooking utensil for keeping warm and cooking which comprises an inner vessel portion, an outer shell portion having an inside diameter larger than that of the inner vessel portion and a height as same as or longer than that of the inner vessel portion, said outer shell portion having a cylindrical shape, and a lid which closes an opening of the inner vessel portion, and a space portion being defined by said inner vessel portion and said outer shell portion, said inner vessel portion and said outer shell portion being combined or connected by a pair of hand grips.

8 Claims, 11 Drawing Sheets

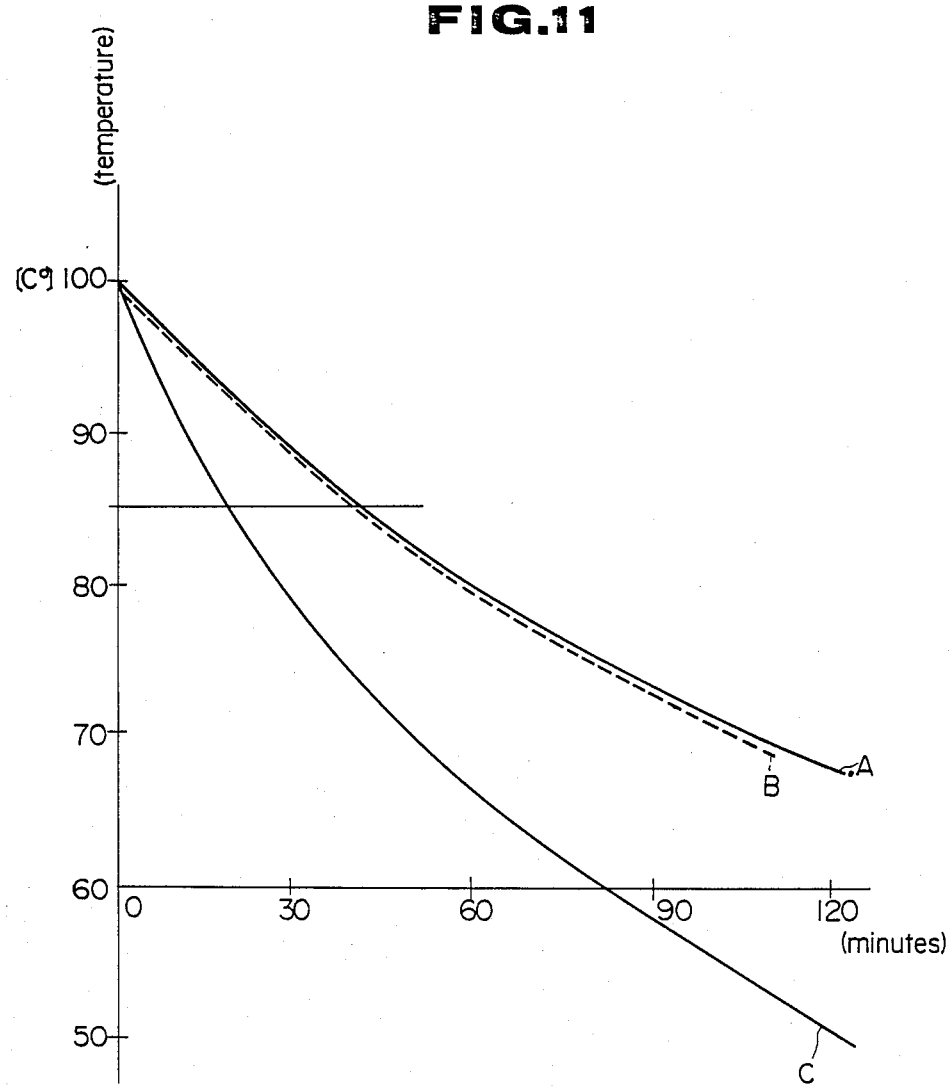

COOKING UTENSIL

BACKGROUND OF THE INVENTION

This invention relates to a cooking utensil for keeping warm and cooking contents therein which enable the sufficient cooking of the contents only using the remaining heat of the cooking utensil and the contents by suspending the heating thereof after boiling or after elapsing a predetermined time of boiling without releasing the nutritive values and perfumes of the food.

Generally, in boiling food in a cooking pan, the pan continues to be heated over the fire even after the contents of the pan become boiled so as to ensure that the food in the pan is sufficiently soft.

It has been found, however, that most foods do not need to be cooked at a temperature of 100° C. For example, potatoes and taros can be adequately boiled at temperatures of 80° C. to 90° C., and when meat is boiled or cooked at temperatures of not less than 80 ° C., the protein thereof is completely denatured. Thus, it has become clear that it is not necessary to continue to heat most of foods in the pan after the food reaches 100° C. and begins to be boiled. Basically, in cooking foods, it is only necessary for most foods to be maintained at suitable temperatures, for example of 80° to 90° C. for a predetermined time period, for example, of 0.3 to 1 hour. Thus, generally, although energy need to be produced to initially heat the food in the pan up to a predetermined temperature, it is not necessary to continue to heat the foods and keep the food boiling except for the purpose of evaporating water, boiling down of the contents, or the like.

In addition, as a result of various investigations, it has been almost confirmed that seasoning, in other words, the permeation of impregnation of the initially added flavorings into the foods is caused by the difference of the osmotic pressure of the water in the foods or between the soup and foods for reasons of the temperature gradients in the foods occurred at the time of temperature reduction after heating or raising the temperature thereof. Thus, it is important to reduce the temperature not abruptly but smoothly and slowly so as to season the boiled food effectively. In the case of quick reduction of the temperature, the gradient of the osmotic pressure of water in the foods becomes great and the inner pressure of the foods becomes lower than that of the outside thereof. For this reason, the structure of the foods is broken and the contraction of the foods occurs.

Furthermore, it is important not to overheat the foods so as to leave the nutrition values of the respective foods and the "flavor" which is the main elements of tastes of the respective foods after cooking. This applies to the prevention of boil crumbling.

From these findings, it became apparent that, if the temperature reducing process of the foods is rendered slow by extremely preventing the scattering or radiation of the remained heat after performing necessary heating for denaturization of the respective foods, total amounts of heat and adding amounts of water used for cooking are greatly reduced and the foods sufficiently seasoned are obtained without losing their nutrition values, their flavorings, and their original shapes.

The present inventors have proposed a pan for keeping warm and cooking which enables to effectively keep warm and cook the foods, different in its conception from the conventional cooking method as is described above(Japanese Utility Model Application No. 35484/1986) prior to the present invention.

The pan for keeping warm and cooking of the previously proposed invention has a structure as shown in FIG. 1. In the drawing, the reference numeral 1 designates the pan and the reference numeral 2 designates its lid. The pan 1 comprises an inner vessel portion 3 being cylindrical and having a bottom wall, and an outer shell portion 5 provided coaxially around the inner vessel portion 3 intervening an annual space portion 4 at a predetermined distance therewith.

The side wall of the inner vessel portion 3 is decreasing in a diameter progressively toward the bottom wall 3a, that is to say, tapering downwardly, and the upper end of the inner vessel portion 3 is directed radially to form a peripheral retainer flange 3b.

The outer shell portion 5 is formed to be of a substantially cylindrical shape, and the lower end 5a of the outer shell portion 5 is slightly bent inwardly, and the upper portion 5b thereof is largely bent inwardly. The inside diameter of the upper end 5b of the outer shell portion 5 is defined smaller than the outside diameter of the peripheral retainer flange 3b of the inner vessel portion 3.

Thus, if the inner vessel portion 3 is inserted from the upper side into the outer shell portion 5, the peripheral retainer flange 3b comes in touch and affixed to or engaged with the upper end 5b of the outer shell portion 5. Thus the inner vessel portion 3 and outer shell portion 5 are engaged to form the consolidated pan 1. Then, the pan 1 can be carried by taking a pair of hand grips 6 secured to the periphery of the outer shell portion 5.

In addition, the hand grips 6 and 6 are fixed to the opposed side surface adjacent to the upper end portion of the inner vessel portion 3. These hand grips 6 and 6 serve e.g. for taking up the pan from fire flame or transferring the pan from one place to another place similarly with the commercially provided pans.

Further, at the upper portion of the outer shell portion 5, a plurality of apertures 5b are bored with a constant interval in the horizontal direction so that the space portion 4 communicates with the atmosphere therethrough.

In the meanwhile, the lid 2 comprises an outer lid 2a and an inner lid 2b, and the outer lid 2a and the inner lid 2b are assembled integratedly in the manner that they include the space portion 2c. The inner lid 2b is made of materials having low heat conductivity and high heat resistance such as heat resistant plastics, glass or the like so as to reduce the scattering or radiation of the heat energy from the inner vessel portion 3 to the outside thereof.

Incidentally, since the lid 2 is not directly in contact with the foods to be heated in the inner vessel portion 3 and intervened by air and thus the scattering or radiation of the heat energy is little in comparison with that of the bottom portion 3a or side surface portion of the inner vessel portion 3, the effect of keeping warm can be considerably realized even if the lid 2 is constituted in a single layer instead of double layers for the purpose of costs down. At this time, if the materials with high insulating properties such as heat resistant plastics, heat resistant glass are used, the effect of keeping warm is more improved.

And then, when the cooking pan with the above construction is, for example, placed on a kitchen gas heater for heating, the fire flame does not escape outwardly intercepted by the lower portion of the outer shell portion 5. Contrary, heated air is directed toward the space portion 4 even if the fire flame of the kitchen gas heater is more or less powerful. Here, the flame and the air with high temperature do not escape outwardly except for passing through the apertures 5b since they flow through the space portion 4 as if they are aspirated in accordance with the shape of the space portion 4 which displays the "chimney effect" by means of the apertures 5a. And further, the air with high temperature entered or flowed in the space portion 4 is uniformly dispersed on the whole outer periphery of the inner vessel portion 3 in accordance with the shape of the space portion 4 formed substantially in a cylindrical configuration and with the result that the heat energy is effectively transmitted to the foods in the inner vessel portion 3.

And then, if the pan 3 is disposed or placed on a plate P as shown in FIG. 1 after boiling the contents in the pan 3 and suspending the heating, the lower end opening flange 5a of the outer shell portion 5 is tightly closed by the plate P and this causes the loss for the passage of the air with high temperature and the heat energy stored in the space portion 4 is preserved without escaping outwardly in spite of the presence of the apertures 5b. The heat in the pan 4 is not scattered outwardly because the heat energy being stored, and the inside of the pan is kept at high temperature for a long time if the pan is closed by the lid 2. As the result, in the case of using this pan, the permeation or impregnation of the taste into the foods can be sufficiently done since the cooking is achieved sufficiently only using the energy necessary up to the initial boiling and the amount of added water is reduced and the reduction of the temperature is achieved very slowly.

Furthermore, the scattering or radiation of the heat energy is more reduced since the inner vessel portion 3 and the outer shell portion 5 are slightly in contact with each other and the contact area thereof is very small upon using the pan, which causes the less transmission of the heat from the inner vessel portion 3 to the outer shell portion 5. In addition, the cleaning of the pan 1 can be readily performed since the pan 1 can be readily disassembled after the completion of using it. Furthermore, a multiplicity of the inner vessel portions and the outer shell portions can be put one over the other, respectively, and is possible to receive them in a small space since the pan can be disassembled to its inner vessel portion 3 and the outer shell portion 5 and the inner vessel portion 3 is decreased in a diameter toward the bottom portion thereof and the outer shell portion 5 is rendered to be slightly decreased in a diameter because of its cylindrical configuration.

The advantages of the pan for keeping warm and cooking and the cooking method using the same which are put to initial practical uses are summarized as follows;

(1) energy-saving;

The pan saves the energy since the efficiency of the heating is superior and it is not necessary to be cooking over a slow fire.

(2) reduction of labor;

The method for keeping warm and cooking using the pan reduces the labor for cooking since the heating period is for a few minutes until the boiling of the contents in the inner vessel portion 3 occurs and the cooking is completed only by leaving the boiled foods while cooking over a slow fire for a long time using commercially provided pan needs labors. In addition, in the case of using the pan for keeping warm and cooking, burning of the foods with carelessness is prevented.

(3) The cooked foods are kept warm for a long time.

(4) The flavor of the cooked foods is not dispersed, that is, the cooked foods are delicious.

(5) The heat up by the fire is uniform.

(6) Gas ranges can be used effectively because the pan occupies the ranges only shortly.

(7) The cooked foods are delicious and the decomposition of the nutrition thereof is little because they are not boiled too excess.

However, as a result of further investigations so as to put the pan for keeping warm and cooking described hereinbefore in practical and economical use, the inventors have found the points to be improved as follows.

That is, at the present time, there exist gas ranges of various sizes as heat sources in a general family, and not restricted to them, further exist ranges which heat using a flat heating plates such as an electric range, an elecromagnetic cooking device or the like. Thus, it is necessary to render the pan described hereinbefore fitting to the ranges of various sizes or the heat sources such as electric ranges, electromagnetic cooking devices or the like.

In the meanwhile, in the conventional pan for keeping warm and cooking, the lower end portion 5a of the outer shell portion 5 projects lower than the bottom portion 3a of the inner vessel portion 3 as shown in FIG. 1. Such a structure is necessary to prevent the scattering or radiation of the heat by rendering the bottom portion 3a of the inner vessel portion 3 not tightly in contact with the flat plane and facing the bottom portion 3a to the plane intervening with an air layer when the pan is disposed or placed on the plane by putting out the fire after completion of heating.

However, in the case of using the pan for keeping warm and cooking at home, it occurs sometimes that the trivet of the gas range is not extended to the periphery thereof in substantially the same diameter as that of the outer shell portion 5 depending on the size of the kitchen gas range used. Thus, in such a case, it is difficult to dispose or place the pan steadily on the trivet and further such an operation is very dangerous since the pan may get out from a part of the trivet to incline on the trivet, and optionally there is a fear to spill the contents of the pan.

In addition, in the case where the heat source used is an electric range or an electromagnetic cooking device, it is desirable that the bottom portion 3a of the inner vessel portion 3 is tightly in contact with the heating surface of the heater. However, taking into consideration of such a convenience and if the lower end 5a of the outer shell portion 5 is aligned to the same horizontal plane as that of the bottom portion 3a of the inner vessel portion 3, the bottom portion 3a of the inner vessel portion 3 tightly contacts with the supporting surface and the air layer required to keep warm is not formed. Consequently, the effect of keeping warm is significantly reduced upon putting out the pan from the fire and keeping warm the contents in the inner vessel portion 3. Of course, the effect of keeping warm of the pan may be increased if the plate of insulating materials such as expandable polystyrene is used as a exclusive sheet for placing the pan. However, the constitution of the pan for keeping warm and cooking in which the air layer is formed under the bottom portion 3a of the inner vessel portion 3 upon placing on the plane would be more convenient because it is not necessary to particularly restrict the positioning place. Such a convenience is very important in the kitchen where the pans are always used.

In addition, the upper portion of the space portion 4 between the inner vessel portion 3 and the outer shell portion 5 of the conventional pan is closed and is constituted so as to render the burnt gas in the space portion 4 exiting to the atmosphere from the apertures 5b provided on the upper portion of the outer shell portion 5. However, when the area of the exit for the heated air is relatively small as the apertures 5b, the flow rate of the warmed air of the burnt gas rising in the space portion 4 is slow and the amount of the air derived from the outside thereof through the bottom portion 3a of the pan 1 is little. For this reason, the temperature of the burnt gas in the space portion 4 is not lowered and the outer shell portion 5 is heated too excess by the vapor with high temperature to a high temperature(about 450° C.).

Further, in the conventional pan for keeping warm and cooking described hereinbefore, a peripheral retainer flange(upper end portion 5c) for engaging with the inner vessel portion 3 is required to be mounted near the upper end portion of the outer shell portion 5 and this causes the high costs for producing the outer shell portion 5.

SUMMARY OF THE INVENTION

It is therefore an object of the invention to improve the performance of the conventional cooking pan for keeping warm and cooking described above and provide a cooking utensil for keeping warm and cooking comprising an inner vessel portion, an outer shell portion having an inside diameter larger than an outside diameter of the inner vessel portion and a height as same as or longer than that of the inner vessel portion, said outer shell portion having a cylindrical shape, and a lid which closes an opening of the inner vessel portion, and a space portion being defined by said inner vessel portion and said outer shell portion, said inner vessel portion and said outer shell portion being combined or connected by a pair of hand grips.

According to the present invention, the outer shell portion separated from the inner vessel portion is constituted in a simple cylindrical shape so as to be produced with ease, and the inner vessel portion and the outer shell portion are combined or connected by the hand grip so as to enlarge an area of exit of the space portion formed between the inner vessel portion and the outer shell portion, and with the result that the production of the outer shell portion and the whole cooking utensil is rendered easy. In addition, according to the present invention, it is possible to prevent the rising of the temperature of the outer shell portion since the upper portion of the space portion between the inner vessel portion and the outer shell portion is sufficiently opened. Furthermore, the cooking utensil according to the present invention can be produced at low costs since the outer shell portion is formed in a simple cylindrical shape and the junction of the inner vessel portion with the outer shell portion is realized by the hand grip.

BRIEF DESCRIPTION OF THE DRAWINGS

FIG. 11 is a graph showing the keeping warm characteristics of the cooking utensil in accordance with the embodiment of the present invention compared with that of the conventional one afore-mentioned and that of the pan commercially provided.

DESCRIPTION OF THE PREFERRED EMBODIMENTS OF THE INVENTION

Figure 1:
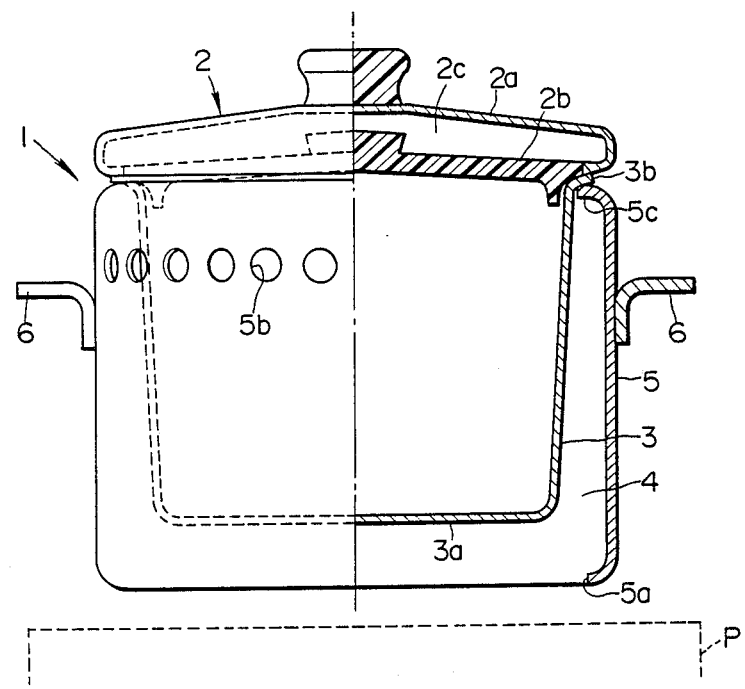
FIG. 1 is a partly cross-sectional side-elevational view of the conventional cooking pan for keeping warm and cooking.

The invention will now be described in details with reference to the drawings in which like reference numerals denote corresponding parts in several views.

Figure 2A:
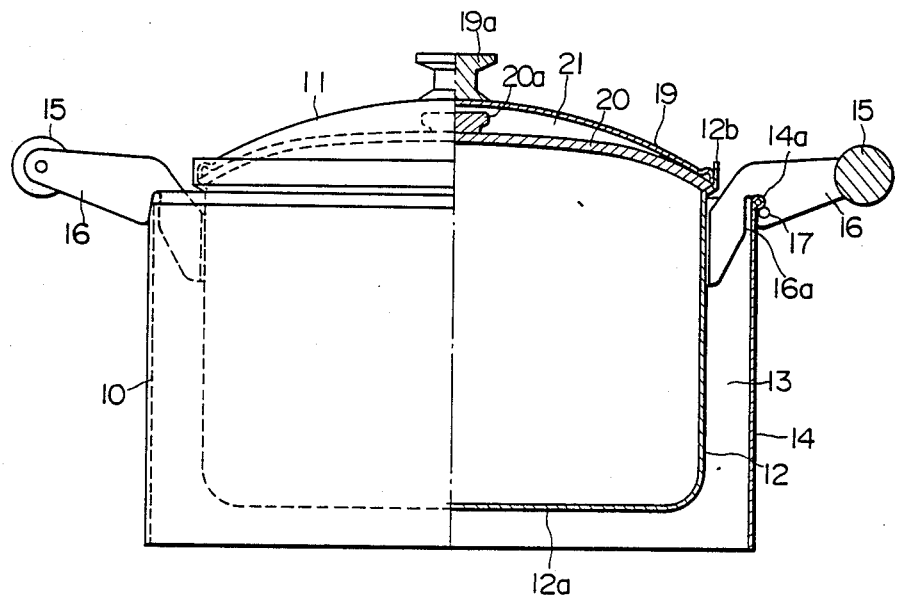
FIG. 2(a) is a partly cross-sectional side-elevational view of the first embodiment of the cooking utensil in accordance with the present invention upon being used.
Figure 2B:
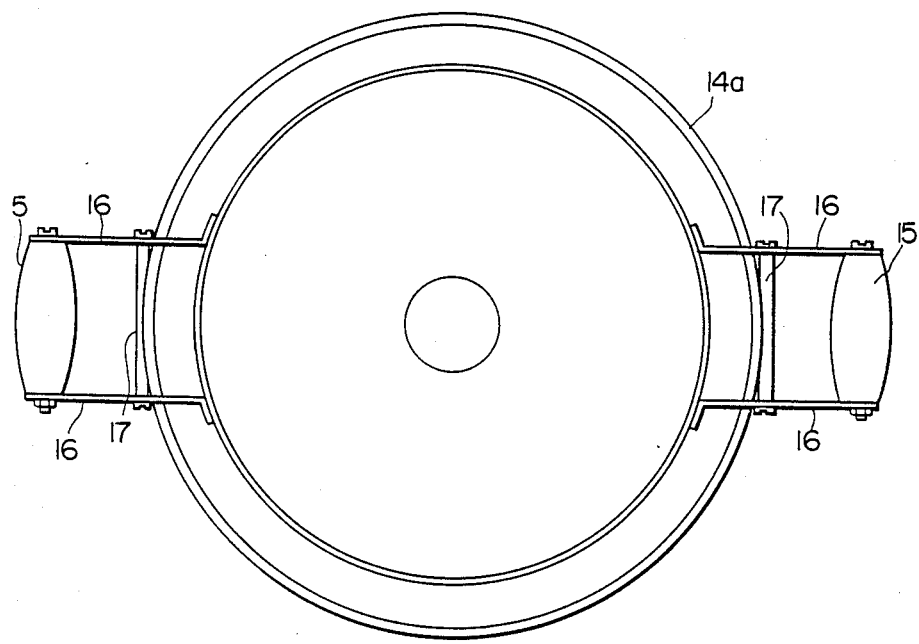
FIG. 2(b) is a plane view of the first embodiment of the cooking utensil shown in FIG. 2(a)

FIGS. 2(a) and 2(b) show the first embodiment of the present invention. In the drawings, reference numeral 10 designates a pan and reference numeral 11 designates a lid.

The pan 10 comprises an inner vessel portion 12 and an outer shell portion 14, the outer shell portion 14 being disposed around the outer peripheral portion of the inner vessel portion 12 with intervening the space portion 13 at a predetermined interval.

The side wall of the inner vessel portion 12 is slightly decreasing in diameter progressively toward the bottom portion 12a thereof, that is to say, tapering downwardly, and the upper end of the inner vessel portion 12 is directed radially outwardly to form a peripheral retainer flange 12b for adapting the lid 11.

The outer shell portion 14 is formed in a simple cylindrical configuration and the upper end thereof is slightly rolled outwardly to be a reinforced flange 14a.

In addition, a pair of hand grips 15 and 15 are secured to the outer peripheral surface of the inner vessel portion 12 adjacent to the upper end of the inner vessel portion 12 in diametrically opposite relation. At the lower portions of the plate-like arm portions 16 and 16 of these hand grips 15 and 15, recess portions 16a and 16a which loosely engage the reinforced flange 14a of the outer shell portion 14 are formed, respectively, and engaging shafts 17 are suspended between the outside lower portions of the respective recess portions 16a of the plate-like arm portions 16 and 16 of the hand grips 15 and 15 so as to secure the inner vessel portion 12 therewith. The plate-like arm portions 16 and 16 are mounted to the inner vessel portion 12 so as to align the width thereof in the perpendicular direction. Such an alignment is so as not to disturb the heat flow of the burnt gas which rises in the space portion 13. In the case of inserting the outer shell portion 14 into the respective recess portions 16a, the reinforced flange 14a is to be in contact with the engaging shaft 17 at the mean portion of the plate-like arms 16 and 16 of the hand grips 15 since the reinforced flange 14a of the upper end of the outer shell portion 14 is bent. In this state, when the hand grips 15 and 15 are forced down with respect to the outer shell portion 14, the reinforced flange 14a is resiliently deformed and the engaging shaft 17 gets over the reinforced flange 14a to position the lower portion of the reinforced flange 14a. As the result, the reinforced flange 14a is secured to be in the state of being engaged or fixed between the engaging shaft 17 and the upper bottom portion of the recess portion 16a and 16a and then the inner vessel portion 12 and the outer shell portion 14 are integratedly combined with each other. In the converse, when the outer shell portion 14 is forced down with respect to the hand grips 15, the engagement of the engaging shafts 17 with the reinforced flange 14a is released and with the result that the inner vessel portion 12 and the outer shell portion 14 can be easily separated with ease. It is preferred that the engaging shafts 17 are made of resilient materials and a coiled spring may be used for its purpose.

Incidentally, in the above constitution, the recess portion 16a and the engaging shaft 17 construct a locking system. This locking system makes it possible to prevent the inconveniences such as slip down of the outer shell portion 14, excess spacing of the upper and lower positions of the inner vessel portion 12 and the outer shell portion 14 at the upper end of the pan, impossibility of the observation of the gas flame from the transverse direction even in the case where the legs of the trivet of the kitchen gas range contact only with the inner vessel portion 12 and the outer shell portion 14 are forced out from the outer periphery of the trivet.

In the meanwhile, the lid 11 comprises an upper wall 19, the upper wall including a hand grip 19a, and a lower wall 20, the lower wall including a hand grip 20a, the upper wall 19 and the lower wall 20 being combined integratedly and capable of being freely assembled and disassembled in such a manner that they include the spacing portion 21. The lower wall 20 is made of materials having low heat conductivity and high heat resistance such as heat resistant plastics, glass of the like and is formed so as to prevent the scattering or radiation of the heat energy in the inner vessel portion 12 outwardly. It is possible to make the upper wall 19 with the same materials as those of the lower wall 20. However, it is preferred that the outer wall 19 is made of the same materials as those of the outer shell portion 14, for example, a stainless steel so as to reflect the radiated heat from the inside of the inner vessel portion.

Incidentally, the scattering of the heat energy through the lid is less than that of the heat energy through the bottom portion or the side surface portion of the pan since the lid 11 is not directly in contact with the foods to be cooked in the inner vessel portion 12. For this reason, the effect of keeping warm can be realized considerably even if the lid is constituted in the form of a single layer structure as usual instead of double layer structure so as to reduce the costs for production. At this time, it is a matter of course that the effect of keeping warm is more improved if the lid is made of the high insulating materials such as heat resistant plastics, heat resistant glass, or the like.

Figure 3A:
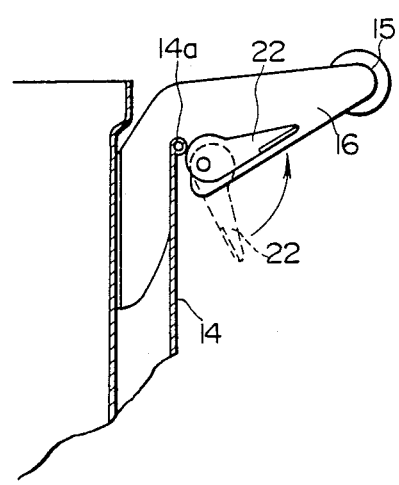
FIG. 3(a) is a side view of a locking system used in the first embodiment of the cooking utensil.
Figure 3B:
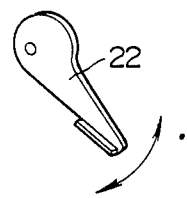
FIG. 3(b) is a perspective view of a stopper constituting the locking system shown in FIG. 3(a)

And then, the above constructed cooking pan ensures the sufficient area of exit for the burnt gas at the time of being used since the upper opening portion of the space portion 13 formed between the inner vessel portion 12 and the outer shell portion 14. Thus, the flow rate of the heat of the burnt gas rising in the space portion 13 is not reduced under heating and this enables the increasing of the amount of air derived from the outside through the bottom portion of the pan. As the result, the outer shell portion 14 is not heated too excess to be high temperature. In addition, the outer shell portion 14 can be produced at low costs because of its simple cylindrical configuration. Furthermore, since the locking system which enable the attaching and detaching of the inner vessel portion 12 to the outer shell portion 14 with ease is provided on the hand grip 15 secured to the inner vessel portion 12, the engagement and release operations of the outer shell portion 14 and the inner vessel portion 12 can be performed with ease while supporting the pan by hanging the hand grip 15. And further, since the outer shell portion 14 can be detached with ease, the outer shell portion 14 does not disturb the transferring operation of the cooked foods in the inner vessel portion 12 to another vessel. Incidentally, in the above embodiment, the locking system may be of the other structures if it has the same functions as the one above described. For example, as shown in FIGS. 3(a) and 3(b), the locking system may be of a structure in which a cam-like stopper 22 is attached to the same position with free revolution instead of providing the engaging shaft 17.

Figure 4A:
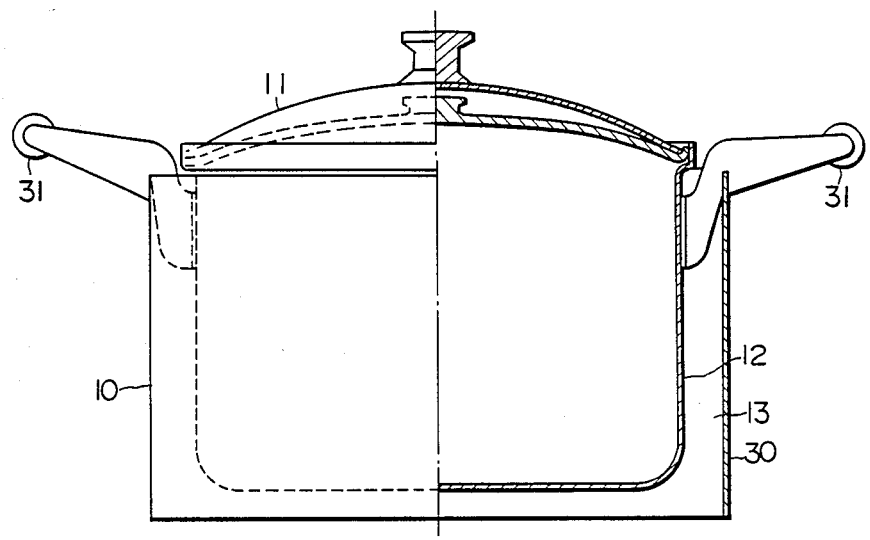
FIG. 4(a) is a partly cross-sectional side-elevational view of the second embodiment of the cooking utensil in accordance with the present invention.
Figure 4B:
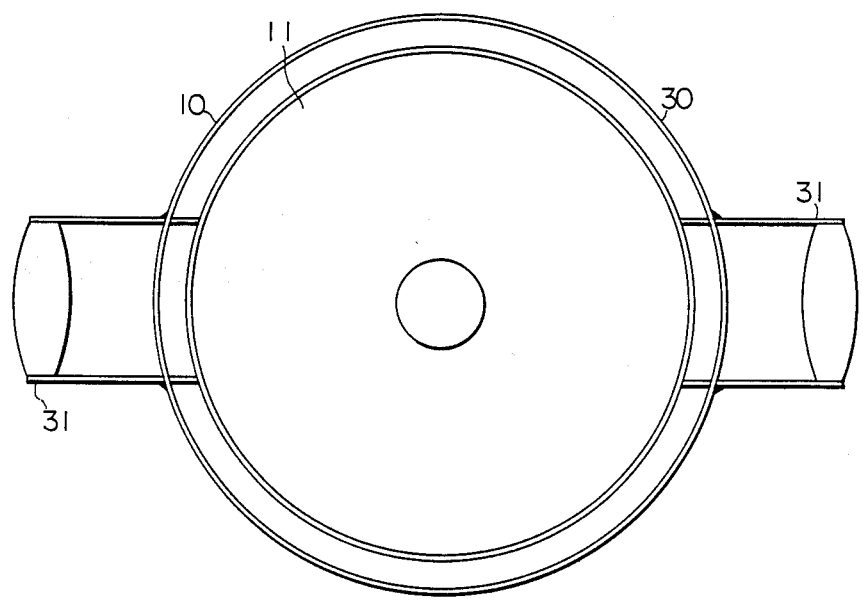
FIG. 4(b) is a plane view of the second embodiment of the cooking utensil shown in FIG. 4(a)

FIGS. 4(a) and 4(b) illustrate the second embodiment of the present invention. In the drawings, the like reference numerals denote the common parts shown in FIGS. 2(a) and 2(a) features of this embodiment exist in that the upper end of the outer shell portion 30 which is in the form of a cylindrical shape is rendered as it is and the upper end of the outer shell portion 30 is fixed to the hand grips 31 and 31 provided on the upper portion of the inner vessel portion 12 by welding. The hand grip 31 is formed substantially in the same configuration and the same size as that of the first embodiment except for the locking system being not provided.

And then, the above constructed cooking pan ensures the sufficient area of the exit for the burnt gas at the time of using since the upper opening portion of the space portion 13 formed between the inner vessel portion 12 and the outer shell portion 30 is formed in a simple cylindrical shape. Thus, the flow rate of the heat of the burnt gas rising in the space portion 13 is not reduced under heating and this enables the increasing of the amount of air derived through the bottom portion of the pan. As the result, the outer shell portion 30 is not heated to high temperature. With the proviso that the outer shell portion 30 can not be detached as occasion demands, the pan according to this embodiment can be produced at low costs since the outer shell portion 30 has a simple cylindrical shape and the conjunction of the inner vessel portion 12 and the outer shell portion 30 is achieved by the general and simple welding means.

Figure 5A:
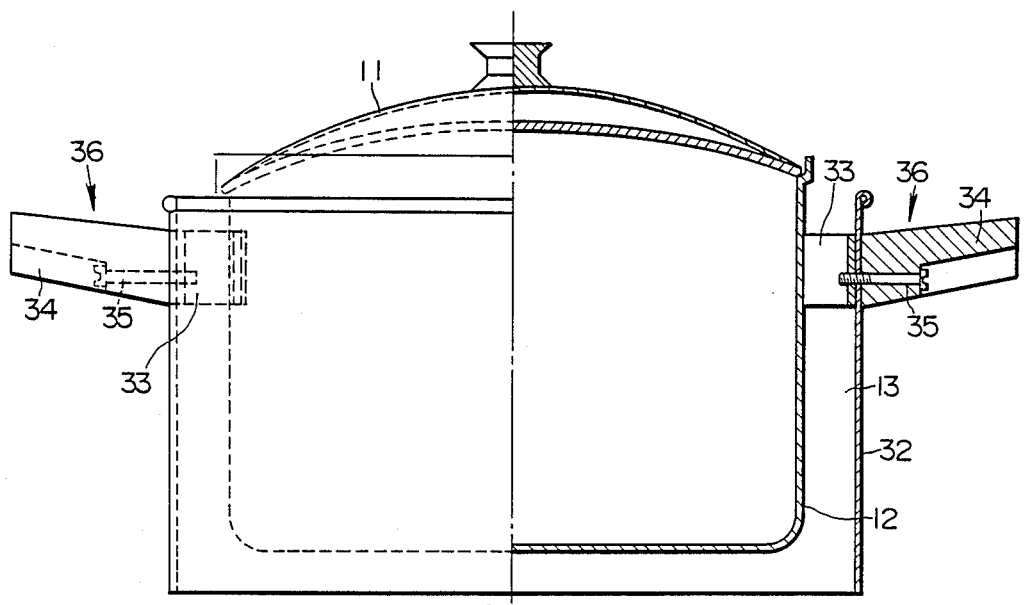
FIG. 5(a) is a partly cross-sectional side-elevational of the third embodiment of the cooking utensil in accordance with the present invention.
Figure 5B:
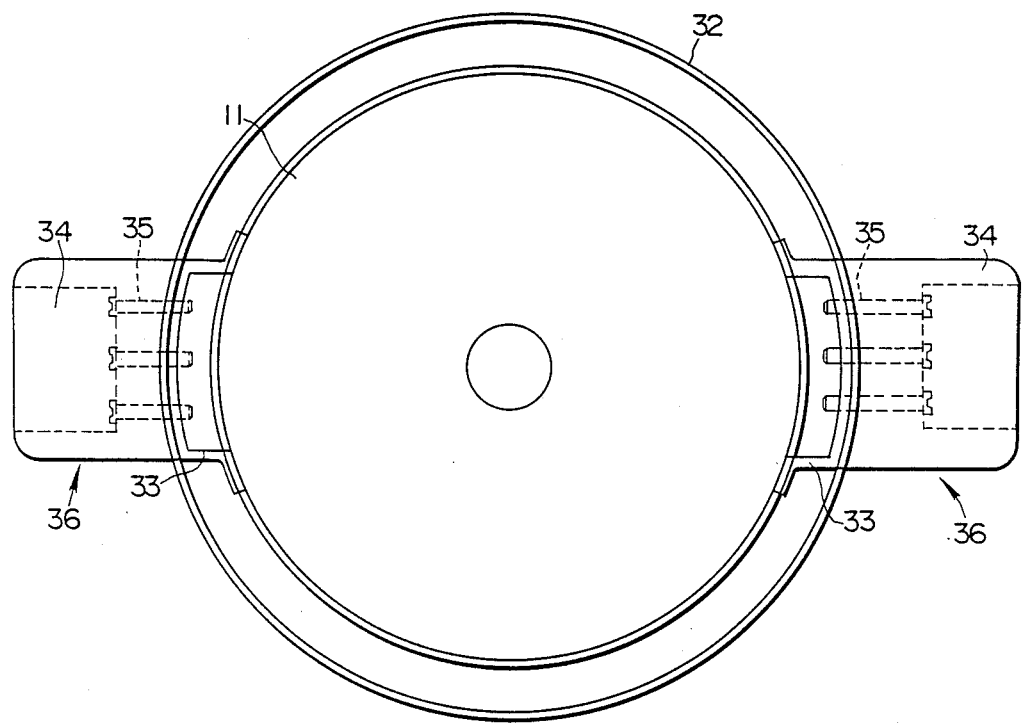
FIG. 5(b) is a plane view of the third embodiment of the cooking utensil shown in FIG. 5(a)

FIGS. 5(a) and 5(b) illustrate the third embodiment of the present invention. In the drawings, the like reference numerals denote the common parts with FIGS. 2(a) and 2(b), and thus the explanations thereabout are simplified. The features of this embodiment exist in the conjunction or connection means between the inner vessel portion 12 and the cylindrical outer shell portion 32. In this embodiment, a pair of fixing metal fittings 33 and 33 are secured to the outer peripheral surface of the inner vessel portion 12 adjacent to the upper end of the inner vessel portion 12 in diametrically opposite relation by spot welding. The height of the fixing metal fittings 33 and 33, that is to say, the size of the perpendicular direction in the drawings, is defined to be as same size as the thickness of the space portion 13. The outer shell portion 32 is come in touch with these fixing metal fittings 33 and 33, and hand grip members 34 and 34 are disposed on the outside portions of the outer shell portion 32 corresponding to the attached portions of the fixing metal fittings 33 and 33, and then the hand grip member 34, the outer shell portion 32 and the fixing metal fittings 33 are integratedly combined by three screws 35. Incidentally, in the above constitution, the fixing metal fittings 33, the hand grip members 34 and the screws 35 are integratedly compose the hand grips 36. The cooking pan for keeping warm and cooking of the third embodiment can exhibit the same functions and effects as those of the cooking pan of the second embodiment.

Figure 6A:
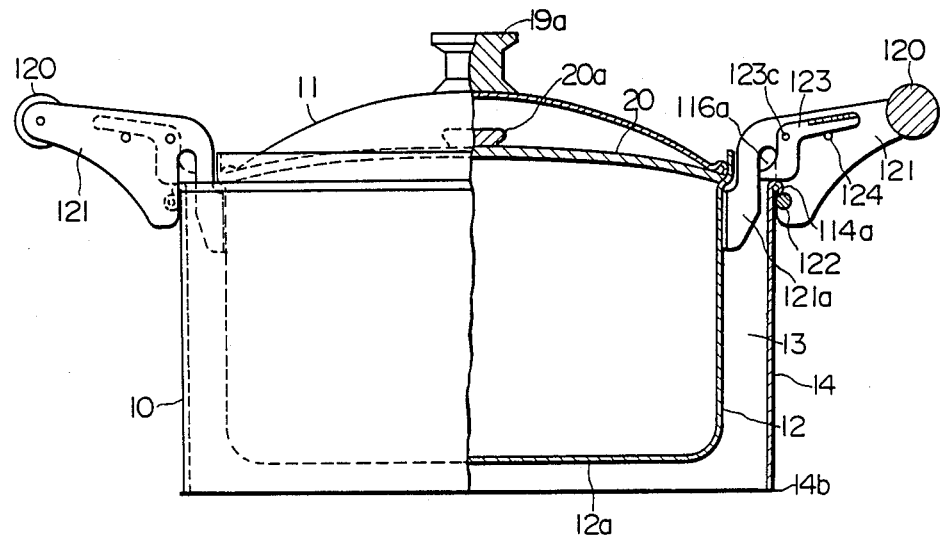
FIG. 6(a) is a partly cross-sectional side-elevational view of the fourth embodiment of the cooking utensil in accordance with the present invention.
Figure 6B:
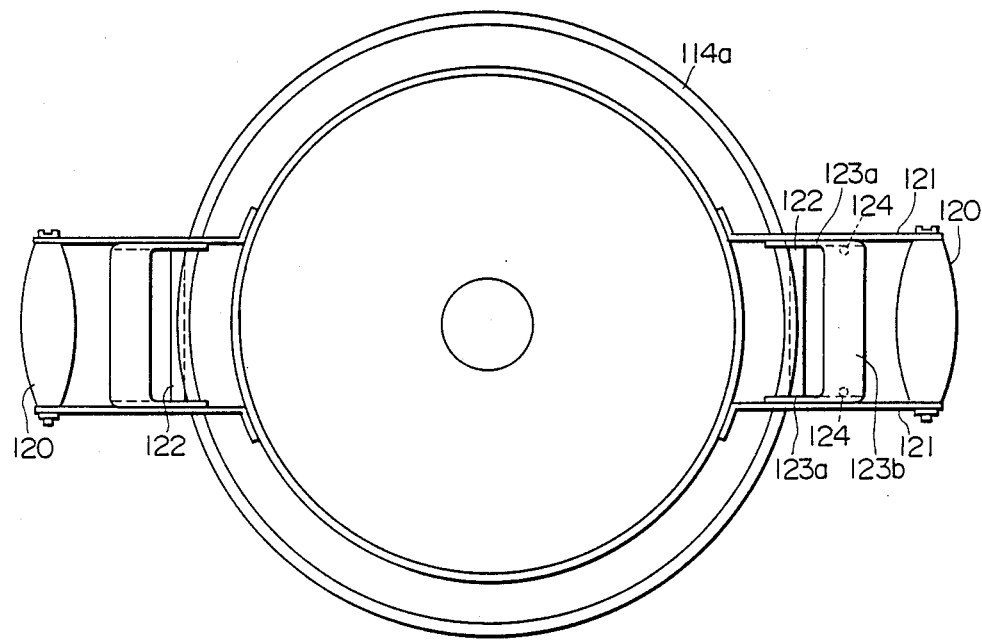
FIG. 6(b) is a plane view of the fourth embodiment of the cooking utensil shown in FIG. 6(a)

FIGS. 6(a) and 6(b) illustrate the forth embodiment of the present invention. In the drawings, the like reference numerals denote the common parts of the first embodiment shown in FIGS. 2(a) and 2(b) and the explanations thereabout are simplified.

The features of this embodiment exist in the structure of the hand grip 120, and the outer shell portion 14 is as same as the conventional one in shape and size.

Figure 7A:
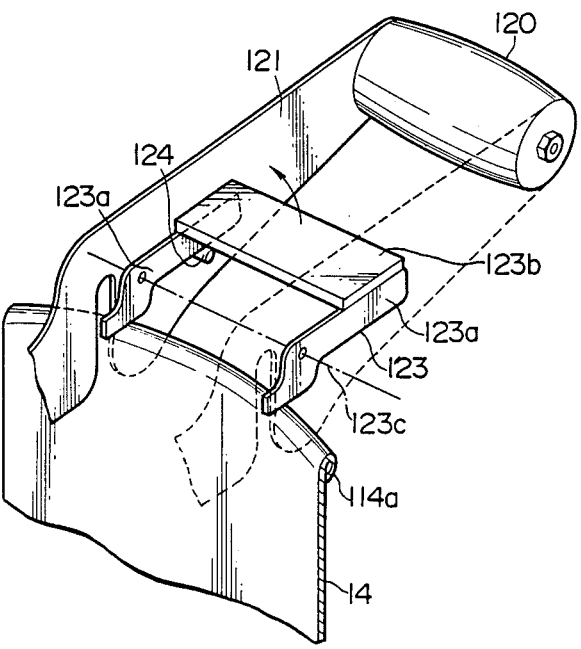
FIG. 7(a) is a perspective view of the fastening or fixing system which constitutes the important portion of the fourth embodiment of the cooking utensil shown in FIGS. 6(a) and 6(b)
Figure 7B:
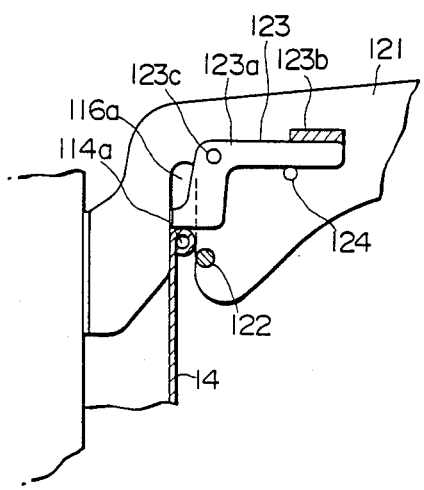
FIGS. 7(b) and 7(c) are side-elevational views of the fastening or fixing system shown in FIG. 7(a) for explaining the operations thereof.
Figure 7C:
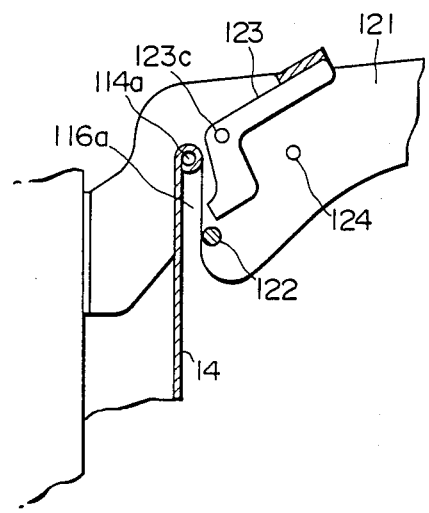

A pair of hand grips 120 are secured to the outer peripheral surface of the inner vessel portion 12 adjacent to the upper end thereof in diametrically opposite relation. Near the inner vessel portion 12 of the plate-like arm portions 121 and 121 of these hand grips 120, recess portions 116a and 116a which loosely engage the reinforced flange 14a of the outer shell portion 14 are formed, and between the lower ends of the outer sides of the respective recess portions 116a of the plate-like arm portions 121 and 121, an engaging shaft 122 is suspended and the hand grip 120 is secured thereto. The structure of the cooking pan according to the fourth embodiment to this point is substantially as same as the one of the first embodiment except for the largeness of the recess portions 116a in size toward the perpendicular direction and the attached positions of the engaging shaft 122 being considerably lower portions of the recess portions 116a. And then, between the plate-like arm portions 121 and 121, revolution and engagement metal fittings(a fixing or fastening system) 123 are attached. This revolution and engagement metal fittings 123 is of a structure that the respective ends of the crank-like arm portions 123a and 123a are integratedly conjuncted revolutionarily freely secured to the hand grip 120 by a shaft pin 123c at the first bent portions of the respective arm portions as shown in FIG. 7(a). To the shaft pin 123c is attached a coiled spring(not shown), which always charges the revolution and engagement fixing metal fittings 123 in the state that the hanging portions 123b is directed toward the downward direction while rotating around the shaft pin 123c. On the inner surface of the hand grips 120 in the neighborhood of the revolution and engagement metal fittings 123, is provided a engaging projection 124, with which the revolution and engagement metal fittings 123 are usually engaged, and the arm portions 123a thereof are rendered substantially horizontal and are disposed at the position that the tips of the arm portions 123a are crossed with the recess portions 116a. Thus, the tip portions of the arm portions 123a of the revolution and engagement metal fittings 123 can be moved from the recess portions 116a if the hanging portions 123b are revolved upwardly. When the revolution and engagement metal fittings 123 are in the normal state, the distance from the lower end of the tip portion of the arm portion 123a to the upper end of the recess portion 116a of the arm portion 123a is defined to be about 5 to 10 mm in size.

In the above constitution, when the hand grips 120 are forced down without operating the revolution and engagement metal fittings 123 and are disposed in the normal state, the engaging shaft 122 gets over the reinforced flange 114a to place at the lower portion thereof and the upper end of the reinforced flange 114a is pressed or pressured to the tip of the arm portion 123a of the revolution and engagement metal fittings 123 to secure the outer shell portion 14 at that position by the engaging shaft 122 as the result of the resilient deformation of the reinforced flange 114a with respect to the engaging shaft 122. At that position, the lower end of the outer shell portion 14 is disposed lower than the bottom portion 12a of the inner vessel portion 12. Thus, such an arrangement suits to keeping the contents of the inner vessel portion 12 warm by disposing the pan on the plate.

In the meanwhile, so as to render the lower end portion 14b of the outer shell portion 14 placing not lower than the horizontal plane of the bottom portion 12a of the inner vessel portion 12 suitable to be in the state of heating on the various heating sources, it may, for example, be preferred that the pan is deposited on the horizontal plate and the hanging portion 123b of the revolution and engagement metal fitting 123 is moved upward with taking the hand grip 120, and the hand grip 120 is forced down to hit the reinforced flange 114a of the outer shell portion 14 to the upper end of the recess portion 116a of the hand grip 120, and then the revolution and engagement metal fitting is gone back to the normal position. As the result, the reinforced flange 14a is forced down by the tip portions of the arm portions 123a of the revolution and engagement metal fitting 123 and the upper end of the recess portions 116a and the outer shell portion 14 is secured to the hand grip 120 at that position and with the result that the lower end portion 14b of the outer shell portion 14 is disposed at a position not less than the horizontal plane of the bottom portion 12a of the inner vessel portion 12. In addition, so as to change the condition from heating to warming, it may be preferred, for example, that the hand grips 120 are taken up while the pan is disposed on the kitchen gas range, and the revolution and engagement metal fittings 123 are revolved, and the hand grips 120 are taken up as they are, and the revolution and engagement metal fittings are made comeback to the original position when the whole pan being taken up. As the result, the reinforced flange 114a of the outer shell portion 14 descends in the recess portion 116a of the hand grips 120 so as to engage with the engaging shaft 122, where the revolution and engagement metal fittings 123 are comeback and the tip of the arm portion 123a is positioned on the reinforced peripheral flange 114a in the recess portion 116a. And thus, the upper and the lower portions of the reinforced peripheral flange 114a is pressured with each other by the engaging shaft 122 and the tip portion of the arm portion 123a of the revolution and engagement metal fittings to secure the outer shell portion 14 at the downwardly moving position and render the pan suitable for keeping warm as shown in FIG. 7(a).

As is described above, according to this embodiment, it is possible to move the horizontal securing position of the lower end portion 14b of the outer shell portion 14 with respect to the bottom portion 12a of the inner vessel portion 12 and apply to the various types of heat sources only by releasing the revolution displacement of the revolution and engagement metal fittings 123 after taking up the hand grips 120, revoluting the revolution and engagement metal fittings 123 and moving up and down the hand grips 120. And further, it is possible to effectively keep the contents of the inner vessel portion warm by forming a space for keeping warm between the plate on which the pan is placed and the bottom portion 12a of the inner vessel portion 12.

Figure 8A:
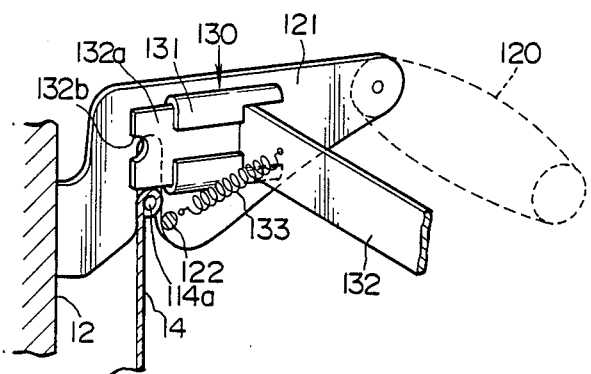
FIG. 8(a) is a perspective view of another fixing system which constitutes the important portion of the fourth embodiment of the cooking utensil shown in FIGS. 6(a) and 6(b)
Figure 8B:
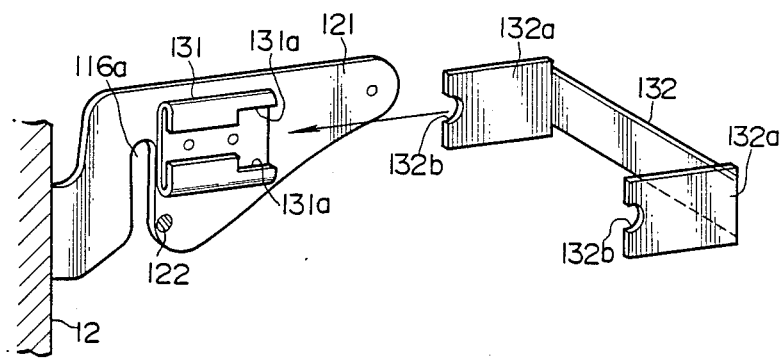
FIG. 8(b) is a fragmentary perspective view of the fastening or fixing system shown in FIG. 8(a)
Figure 8C:
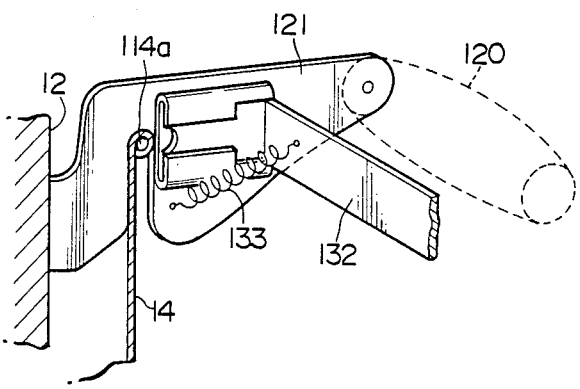
FIG. 8(c) is a perspective view of the fastening or fixing system in the state of operation shown in FIG. 8(a)

FIGS. 8(a), 8(b) and 8(c) illustrate another fixing or fastening system of the fourth embodiment of the present invention. The fixing or fastening system 130 comprises guide rails 131 and 131 fixed to the inner surfaces of the respective plate-like arm portions 121 and 121 of the hand grip 120, a stopper 132, both bent end portions of the stopper being inserted in the guide rails 131 and 131, respectively, and a spring 133, said spring charging the stopper toward the inner vessel portion 12.

Both the end portions of the plate-like members of the guide rail 131 are bent, and on the ends portions of the same sides of the both bent portions, notch portions 131a and 131a are provided.

In addition, the stopper is made up of the plate-like members, both ends of which are bent perpendicularly and semi-circular recess portions 132b and 132b for engagement are provided on the tip surfaces of the both ends 132a and 132a thereof.

Both the ends 132a and 132a of the stopper 132 are charged toward the inner vessel portion 12 by the springs 133 and 133 in the state of being inserted into the respective guide rails 131 and 131. In the normal state, the mean portion of the stopper 132 are engaged with the notched portions 131a and 131a of the guide rail, and the engagement recess portions 132b and 132b on the tip surfaces of the both ends portions 132a and 132 are placed or disposed on the upper end portions of the recess portions 116a of the hand grips 120. In addition, the distance between the end portion 132a of the stopper 132 and the engagement shaft 12 is defined so as to be slightly excess than the diameter of the reinforced peripheral flange 5a of the outer shell portion 14 in size.

And then, in the above constitution, when the hand grips 120 are forced down not with operating the stopper 132 but with disposing it in the normal state, the engaging shaft 122 gets over the reinforced peripheral flange 114a to position the lower end thereof, the upper end of the reinforced peripheral flange 114a are pressed to the both ends 132a and 132a of the stopper 132, and the outer shell portion 14 is secured to the hand grips 120 at the position, as the result of the resilient deformation of the reinforced peripheral flange 14a with respect to the engaging shaft 122. At that position, the lower end of the outer shell portion 14 is placed lower than the horizontal plane of the bottom portion 12a of the inner vessel portion 12. Thus, this state suites to place the pan on the plate and keep the contents of the inner vessel portion 12 warm.

In the meanwhile, so as to dispose or place the lower end portion 14b of the outer shell portion 14 not lower than the horizontal plane of the bottom portion 12a of the inner vessel portion 12 suitable for heating on the various heat sources, it is, for example, preferred to dispose the pan on the horizontal plane of the plate, move the stopper 132 spaced from the inner vessel portion 12 with taking the hand grips 120 and 120, force down the hand grips 120, hit the reinforced peripheral flange 114a of the outer shell portion 14 to the upper end of the recess portion 116a of the hand grip 120 and make the stopper 132 comeback to the normal position. As the result, the reinforced peripheral flange 114a is secured to the engaging recess portions 132b and 132b on the tip surface of the both ends 132a and 132a of the stopper 132 and recess portion 116a, and the outer shell portion 14 is fixed or fastened to the hand grips 120, and further the lower end portion 14b of the outer shell portion 14 is disposed or placed to not lower than the horizontal plane of the bottom portion 12a of the inner vessel portion, as shown in FIG. 8(c).

In addition, so as to change the condition from suitable for heating to suitable for keeping warm, it is, for example, preferred to make the stopper 132 comeback at the state that the pan is wholly taken up by taking the hand grip 120 in the state of disposing the pan on the kitchen gas range, drawing the stopper 132 to the handling portions of the hand grips 120, taking up the hand grips 120 as they are. As the result, the reinforced peripheral flange 114a descends in the recess portion 116a of the hand grip 120 to be engaged with the engaging shaft 122, at which the stopper 132 returns and positions the reinforced peripheral flange 114a. Then, the reinforced peripheral flange 114a is forced or pressured upand downwardly by the engaging shaft 122 and the stopper 132, and the outer shell portion 14 may be secured at its downwardly moving position to render the pan suitable for keeping warm as shown in FIG. 8(a).

As is described above, the horizontal fixing position of the lower end portion 14b of the outer shell portion 14 can be moved up and down with respect to the bottom portion 12a of the inner vessel portion 12 to apply to the various types of heating sources only by releasing the moving displacement of the stopper 132 after transferring the stopper 132 with taking the hand grips 120 and moving the hand grip 120 up and down. At the same time, the excellent effect for keeping the contents of the inner vessel portion warm is realized by forming the space for keeping warm between the plate on which the pan is disposed and the bottom portion of the inner vessel portion even at the time of the keeping warm after raising the temperature of the pan.

Figure 9A:
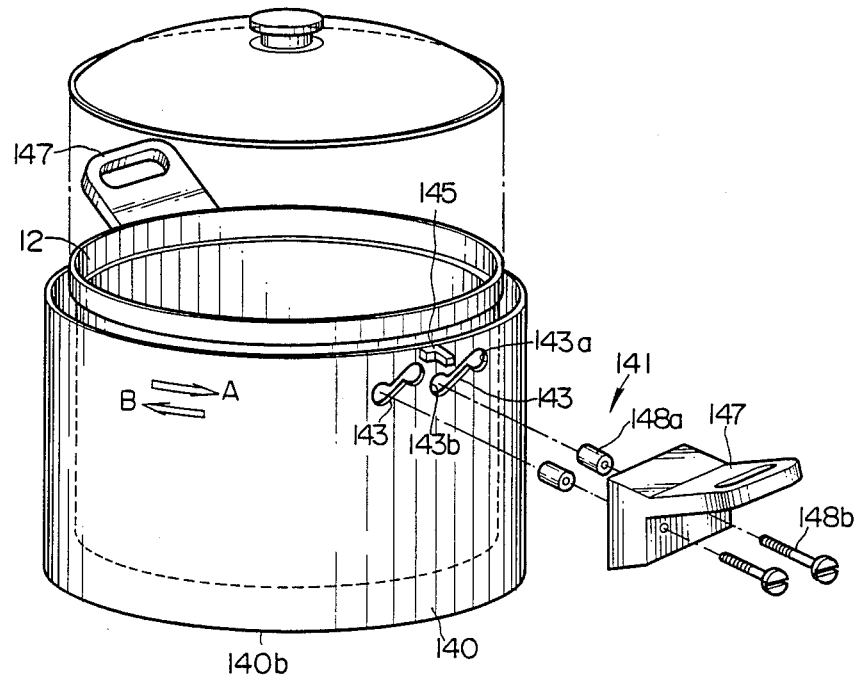
FIG. 9(a) is a schematic perspective view of the fifth embodiment of the cooking utensil in accordance with the present invention.
Figure 9B:
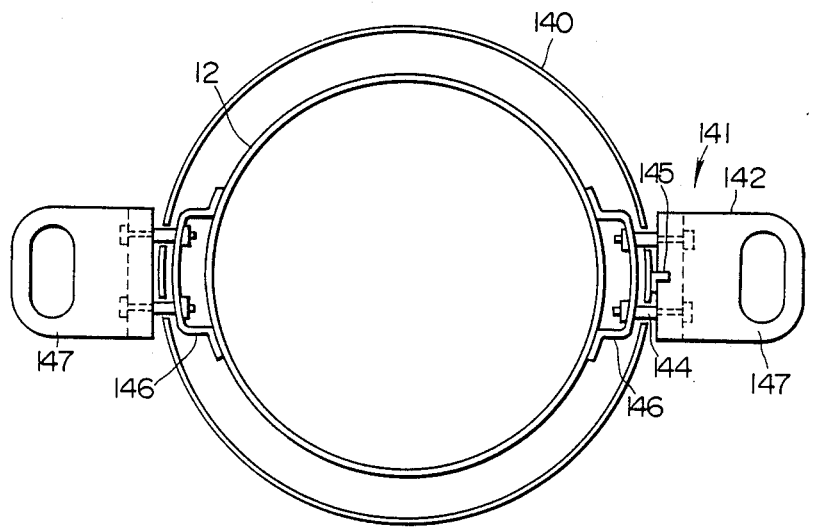
FIG. 9(b) is a plane view of the fifth embodiment of the cooking utensil shown in FIG. 9(a)

FIGS. 9(a) and 9(b) illustrate the fifth embodiment of the present invention. The features of this embodiment exist in that the fixing or fastening system 141 is formed extending from the outer shell portion 140 to the hand grips 142. In other words, the fixing or fastening system 141 comprises a pair of inclined openings 143 and 143 formed adjacent to the upper end of the outer shell portion 140 and conjunction arms 144 and 144 provided on the hand grips and penetrating the inclined openings 143 and 143.

The outer shell portion 140 is made of a metal plate forming a simple cylindrical configuration without the reinforced peripheral flange formed by rolling the end portion adjacent to the upper end portion different from the embodiments described hereinbefore. Furthermore, the particular difference of this outer shell portion 140 according to this embodiment lies in the formation of a pair of inclined openings 143 and 143 on the periphery of the outer shell portion 140 in the opposite relation, respectively. These inclined openings 143 are in a shape of slit, the upper and lower ends thereof being downwardly and upwardly enlarged in diameters, respectively, to form the upper diameter-enlarged engaging portion 143a and lower diameter-enlarged engaging portion 143b, respectively. In addition, on the upper ends of the inclined openings 143 and 143, the projections for operations 145 (hereinafter refer to operating projections) are provided.

On the other hand, the hand grips 142 are those that the handling portions 147 are connected to the fixing metal fittings 146 secured to the outside surface of the inner vessel portion 12 by connecting or conjunction arms 148 and 148. The connecting or conjunction arm 148 comprises cylindrical posts 148a and screws 148b penetrating the posts 148a, and are loosely engaged with the inclined openings 143 of the outer shell portion 40 upon assembling of the hand grips.

And then, in the above constitution, so as to dispose or plane the lower end portion 140b of the outer shell portion 140 to a position not lower than the horizontal plane of the bottom portion 12a of the inner vessel portion 12 suitable for heating on the various heat sources, the pan may be disposed or placed on the heat source by revolving the operating projection completely toward the direction shown the arrow A in FIG. 9(a) with taking the handling portion 147 of the hand grip 142. As the result, the connecting or conjunction arms 148 and 148 are positioned at the lower diameter-enlarged portions 143b and 143b and engaged with the lower diameter enlarged portions 143b and 143b to be secured to the positions and the lower end 40b of the outer shell portion 140 is positioned not lower than the horizontal plane of the bottom portion 12a of the inner vessel portion 12.

In addition, so as to change the condition from the state suitable for heating to the state suitable for keeping warm, it may be preferred that the operating projection 145 is revolved completely toward the direction of the arrow B shown in FIG. 9(a) with taking the handling portions 147 of the hand grips 142 to dispose or place the pan on the plate in that situation. As the result, the connection or conjunction arms 148 and 148 are positioned at the upper diameter-enlarged portions of the inclined openings 143 and 143, and the lower portion 40b of the outer shell portion 40 is disposed or placed at the lower position than that of the bottom portion 12a of the inner vessel portion 12. And then, it is possible to form a spacing for keeping warm between the bottom portion 12a of the inner vessel portion 12 and the plate because the connection or conjunction arms 148 and 148 are engaged with the upper diameter-enlarged portions 143a and 143a to be secured to that position even if the inner vessel portion 12 descend by its own weight.

As is described above, the horizontal fixed position of the lower portion 140b of the outer shell portion 140 can be moved up and down with respect to the bottom portion 12a of the inner vessel portion 12 to apply the pan to the various types of heat sources only by revolving the outer shell portion 140 by means of the operating projection with taking the hand grips 120. At the same time, it is possible to perform the effective keeping warm procedure by forming the spacing between the plate on which the pan is deposited and the bottom portion 12a of the inner vessel portion 12.

Figure 10A:
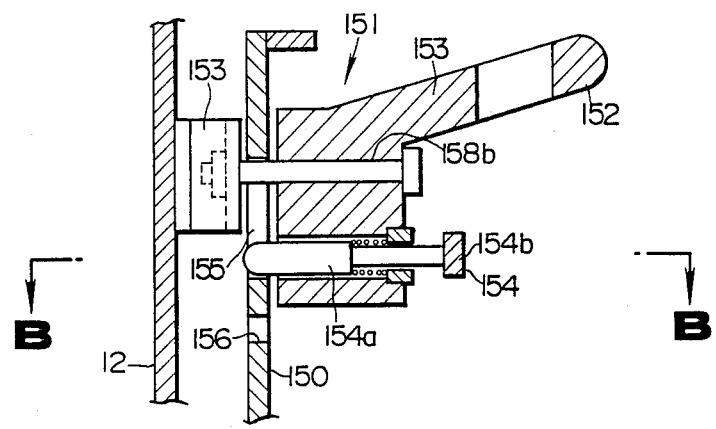
FIG. 10(a) is a fragmentary side-elevational view of the fastening or fixing system which constitutes the important portion of the fifth embodiment of the cooking utensil.
Figure 10B:
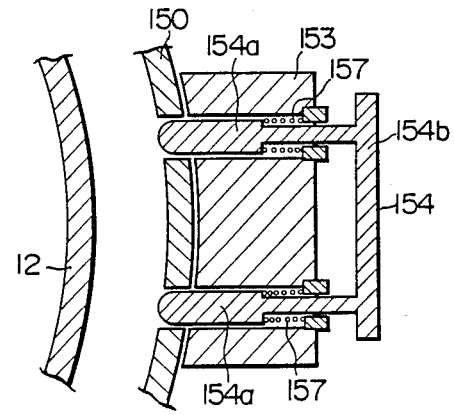
FIG. 10(b) is a fragmentary constitutional view of the fixing system shown in FIG. 10(a) cut along the line B—B.
Figure 10C:
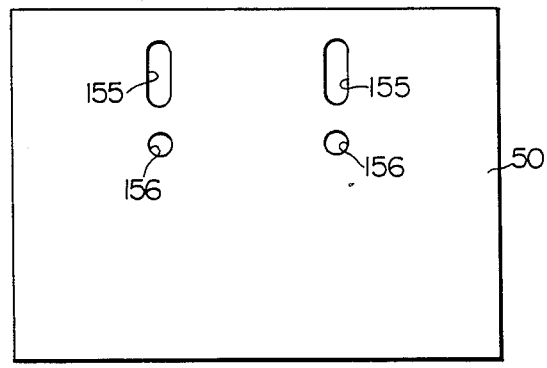
FIG. 10(c) is a side-elevational view of the outer shell of the fifth embodiment of the cooking utensil.

FIGS. 10(a), 10(b) and 10(c) illustrate another fixing or fastening system of the fifth embodiment of the present invention. The fixing or fastening system 151 comprises a stopper 154 provided with making frequent appearances on the lower portion of the handling portion 153 of the hand grips 152 having substantially the same configuration as that of the fifth embodiment, a pair of slits 155 and 155, and a pair of circular openings 56 and 56 formed on the upper side surface of an outer shell portion 150.

As shown in FIG. 10(b), the stopper 154 comprises pinlike members 54a and 54a, the pin-like members 154a and 154a horizontally penetrating the respective handling portions 153 and plate-like suspending portions 154b, and the suspending portion integratedly combining the pin-like members at their end portions. And thus, the stopper 154 is charged toward the direction of the inner vessel portion 12 by a spring 57 provided on the openings for moving the pinlike members 154a and this causes the tip of the pin-like members 154a so as to engage with the slits 155 or the circular openings 156 of the outer shell portion 150.

Incidentally, in the drawings, the reference numeral 158a designates fixing metal fittings forming the hand grips 152, and the reference numeral 158b designates conjunction metal fittings. The conjunction metal fittings 158b penetrate the slits 155.

And then, in the above constitution, so as to dispose or place the lower portion 150b of the outer shell portion 150 not lower than the horizontal plane of the bottom portion 12a of the inner vessel portion 12 suitable for heating condition on the various heat sources, the stopper 154 is made comeback to the original position after moving the stopper 154 toward the spacing direction from the inner vessel portion 12 and forcing down the pan to the flat surface with taking the handling portion 153 of the hand grips 152.

As the result, the connecting arms 158b and 158b are rendered hitting to the lower portion of the slits 155 and 155 so as to engage the pin-like members 154a and 154a with the circular openings 156 and 156, and then, even if the outer shell portion 150 tends to descend by its own weight, the lower end portion 150b of the outer shell portion 150 is disposed or placed at the position not lower than the horizontal plane of the bottom portion 12a of the inner vessel portion 12 because the pin-like members 154a and 154a are engaged with the circular openings 156 and 156.

In addition, so as to change the condition from the state suitable for heating to the state suitable for keeping warm conversely, the stopper 154 may be returned to the original position after moving the stopper 154 toward the spacing direction from the inner vessel portion 12 and taking up the pan with respect to the outer shell portion 150 while taking the handling portion 153 of the hand grip 152. As the result, the conjunction arms 158b and 158b hit to the upper end of the slits 155 and 155 to engage the pinlike members 154a and 154a with the slits 155 and 155, and then even if the inner vessel portion 12 tends to descend, the pin-like members 154a and 154a engage the lower portions of the slits 155 and 155 to be fixed at the position and this enables to form the spacing for keeping warm between the bottom portion 12a of the inner vessel portion 12 and a flat plate.

As is described above, the horizontal fixing position of the lower end portion 150b of the outer shell portion 150 can be moved up and down only by moving the stopper 154 with taking the hand grip 152 so as to apply the pan to the various types of heating sources. And at the same time, it is possible to perform the effective keeping warm by forming the spacing for keeping warm between the plate on which the pan is placed and the bottom portion 12a of the inner vessel portion 12 even at the time of keeping warm after raising the temperature of the pan.

Incidentally, in the embodiments of the fourth to the fifth, it is necessary to deposit or place the position of the lower end portion of the outer shell portion at the same horizontal surface with the bottom portion of the inner vessel or the slightly higher position than the bottom portion of the inner vessel portion, in the case where the heating is performed using the heat source having the heating surface such as that of electric ranges because it is necessary to tightly contact the bottom portion of the inner vessel portion with the heating surface.

EXAMPLE

The present invention will be now demonstrated in its effect using the particular examples.

Experimental Example

This experimental example demonstrates the keeping warm performance of the pan according to the present invention(designated by (A) in comparison with that of the pan previously proposed by the present inventors(-designated by (B) and the usual pan commercially provided(designated by (C). The capacities thereof were made the same. After pouring 1500 cc of water into the respective pans and boiling the respective waters, the changes of the temperature of the waters therein with time are determined by depositing or placing the respective pans on the flat stainless kitchen cooking plate at 20° C., respectively. The measurement was performed automatically by inserting a thermocoupler type temperature measuring device into the hot waters. The results of the measurement was shown in FIG. 11.

Incidentally, though the thermocurve of the pan according to the present invention was drawn with being deviated from that of the conventional cooking pan for keeping warm and cooking in the drawing, both the thermocurves overlaps with each other practically and they are conveniently shown with deviation.

Apparent from the drawing, both the temperature of the water in the pan for keeping warm and cooking of this invention and the temperature of the water in the conventional pan for keeping warm and cooking are maintained at 75° C. after 80 minutes and further maintained at 70° C. after 2 hours while the temperature of the water in the usual pan provided commercially(thermocurve C) reduced to 60° C. after 80 minutes. Thus, the pan of the present invention has the performance for keeping warm as same as that of the conventional one proposed by the present inventors and it will be found that the performance of keeping warm is not disturbed even though the area for exiting the burnt gas of the upper end of the space portion is sufficiently enlarged, if the lower portion of the outer shell portion is completely closed by depositing the pan on the flat plate after boiling.

Furthermore, the cooking example performed to ensure the practical effects of the pan for keeping warm and cooking of the present invention will be demonstrated hereinafter.

Cooking Example (1) Pans used for the experiment diameter of the present invention and the one whose outer shell portion is removed from the pan for keeping warm and cooking of the present invention were used.

(2) Food and the materials

Food; vegetable stew
Materials;
    water; 880 cc (present invention)
    1000 cc(the pan commercially provided;
    120 cc of water is evaporated at a slow fire)
    potato; medium size 3 pieces 280 g (after peeling; 210 g)
    onion; medium size one piece, 170 g
    carrot; medium size a half piece, 70 g
    pork(sliced ham); 150 g
    flavoring matter; salt small spoon 3 cups (3) The results The several characteristics required for cooking such as heating time, amounts of heating or the like were those shown in Table 1.

TABLE 1

|  | pan of this invention | pan provided commercially |
| --- | --- | --- |
| Time required up to boiling | 6.5 minutes | 7 minutes |
| Time of the small fire | 0 minute | 14.5 minutes |
| Time for keeping warm and cooking | 20 minutes | 0 minute |
| Amount of the used gas (13,000 Kcal/m$^3$) | 0.0256 m$^3$ | 0.0412 m$^3$ |
| Evaporated amounts of water | 0 cc | about 120 cc |

When using the pan of this invention, the heating time of the small fire is 0 minutes since the keeping warm and cooking are performed by putting out the fire immediately after boiling and disposing the pan on the flat plate. In the converse, when using the pan commercially provided, the time for keeping warm and cooking is 0 minute since the pan is heated until the foods are completely cooked.

In addition, the qualities of the respective foods obtained are those shown in Table 2.

TABLE 2

| item to be compared | pan of this invention | pan provided commercially |
|---|---|---|
| harshness | very little | a large quantity |
| transparency of the soup | transparent | slightly opaque |
| flavoring | good, particularly, the flavor of the carrot is good. | hardly sensitive |
| state of the boiled potato | very nice | not tasty and watery |
| softness of the pork | soft | hard |
| taste | very good | slightly good |

Incidentally, the judgments of the taste were done by 10 numbers of the general housewives.

As being apparent from these tables, in the case where the cooking is performed using the pan according to the present invention, the time and energy used for cooking is greatly reduced to obtain the delicious food with maintaining the flavor and without escaping the nutrition of the materials.

Although some specific embodiments of the present invention have been herein shown and described, it will be understood that numerous details of the constitution shown may be varied or modified without departing from the spirit of the present invention as defined by the following claims.

What is claimed is:

1. A cooking utensil which comprises
   an inner vessel portion;
   an outer shell portion having an inside diameter larger than that of the inner vessel portion and a height as same as or longer than that of the inner vessel portion, said outer shell portion having a cylindrical shape and
   a lid which closes an opening of the inner vessel portion, and a space portion being defined by said inner vessel portion and said outer shell portion, said inner vessel portion and said outer shell portion being combined or connected by a pair of hand grips, wherein each of said hand grips is secured to the outer peripheral surface of the inner vessel portion adjacent to the upper and thereof in diametrically opposite relation, each of said hand grips having plate-like plate arm portions, said plate-like plate arm portions including a recess portion at a mean portion thereof and an engaging shaft provided on an outer side of the recess portion of the platelike arm portion which engages a reinforced flange of the outer shell portion.

2. A cooking utensil comprising:
   (a) a vessel member having a bottom wall and a side wall joined together;
   (b) an outer shell having a horizontal cross-section similar to, and larger than, a horizontal cross-section of the vessel member, the outer shell having upper and lower ends;
   (c) at least one pair of handgrips fixed to the vessel member, each of the handgrips having at least one downwardly disposed recess opened to receive the outer shell when the vessel member is held within the outer shell,
   whereby, when inserting an upper end of the outer shell into the recess of the hand grips to hold the vessel member in a fixed relation within the outer shell, the lower end of the outer shell is disposed at a position lower than the bottom of the vessel member, and the outer shell is disposed around the vessel member so as to define a peripheral gap between the vessel member and the outer shell.

3. The coking utensil according to claim 2 wherein the outer shell is disposed outside and around the vessel member so that the gap between the outer shell and inner vessel is of uniform width.

4. The cooking utensil according to claim 2, wherein said vessel member has an outer peripheral surface, and an upper end, and the outer shell has a reinforced flange, and wherein each of the hand grips is secured to the center peripheral surface of the vessel member adjacent to the upper end thereof in opposite relation, each of said hand grips having plate arm portions, said plate arm portions including a recess at a mean portion thereof and a securing means on the outside of the recess portion of the plate arm portion which engages the reinforced flange of the outer shell.

5. The cooking utensil according to claim 4, wherein said securing means is formed of elastic material so as to detachably hold the vessel member with respect to the outer shell.

6. A cooking utensil according to claim 2, wherein said inner vessel and said outer shell are welded at a mean portion of each said hand grip.

7. A cooking utensil according to claim 1, wherein each of said hand grips further includes revolution and engagement fittings, each of said revolution and engagement fittings comprising:
   crank-like arm portions each having a tip portion; and
   a shaft pin, said shaft pin passing through said crank like arm portions so as to secure respective crank-like arm portions to respective plate-like arm portions so that said crank-like arm portions are free to rotate about said shaft pin, each said plate-like arm portion further having an engaging projection with which said respective crank-like arm portion engages when said crank-like arm portions are rotated to an engaging position, each said tip portion intersecting said respective recess portion of said plate-like arm portion when said crank-like arm portions are rotated to said engaging position, and each said tip portion not intersecting said respective recess portion when said crank-like arm portions are rotated to a position away from said engaging position.

8. A cooking utensil according to claim 1, wherein each said plate-like arm portion has an inner surface and each of said hand grips further includes a fastening system which comprises:
   a pair of guide rails, each said guide rail being fixed to said inner surface of the respective plate-like arm portion;
   a stopper having first and second bent portions, each said bent portion being adapted for insertion in one of said guide rails; and
   a spring connected to said stopper so as to charge said stopper toward said inner vessel portion for releasably fastening said outer vessel of said inner vessel.

* * * * *